(12) United States Patent
Linton et al.

(10) Patent No.: US 11,917,404 B2
(45) Date of Patent: *Feb. 27, 2024

(54) CELLULAR NETWORK AUTHENTICATION UTILIZING UNLINKABLE ANONYMOUS CREDENTIALS

(71) Applicant: INTERNATIONAL BUSINESS MACHINES CORPORATION, Armonk, NY (US)

(72) Inventors: Jeb R. Linton, Manassas, VA (US); Michael Amisano, East Northport, NY (US); John Melchionne, Kingston, NY (US); Dennis Kramer, Siler City, NC (US); David K. Wright, Monroe, MI (US); John Behnken, Hurley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,208

(22) Filed: Mar. 7, 2023

(65) Prior Publication Data

US 2023/0209342 A1 Jun. 29, 2023

Related U.S. Application Data

(63) Continuation of application No. 16/510,020, filed on Jul. 12, 2019, now Pat. No. 11,627,459, which is a
(Continued)

(51) Int. Cl.
*H04W 12/06* (2021.01)
*H04W 12/02* (2009.01)
*H04W 8/04* (2009.01)

(52) U.S. Cl.
CPC .......... *H04W 12/06* (2013.01); *H04W 12/02* (2013.01); *H04W 8/04* (2013.01)

(58) Field of Classification Search
CPC .............................. H04W 12/06; H04W 12/02
See application file for complete search history.

(56) References Cited

U.S. PATENT DOCUMENTS 7,953,888 B2   5/2011   Ricciulli
8,989,710 B2   3/2015   Mohajeri
(Continued)

OTHER PUBLICATIONS

Vullers et al., "Efficient Selective Disclosure on Smart Cards Using Idemix*", IIDMAN 2013, IFIP AICT 396, IFIP International Federation for Information Processing 2013, Berlin, Heidelberg, pp. 53-67, 2013, 15 pages.
(Continued)

*Primary Examiner* — Muthuswamy G Manoharan
(74) *Attorney, Agent, or Firm* — Gavin Giraud; Andrew D. Wright; Calderon Safran & Cole, P.C.

(57) ABSTRACT

Methods for cellular network authentication utilizing unlinkable anonymous credentials are disclosed. In embodiments, a method includes: contacting, by a computing device, a mobile device network with a request to connect to the mobile device network; conducting, by the computing device, an interactive credential issuance protocol with an Issuer of the mobile device network to generate an unlinkable anonymous credential; and connecting, by the computing device, to the mobile device network based on a Verifier of the mobile device network verifying the computing device based on the unlinkable anonymous credential.

20 Claims, 5 Drawing Sheets

Related U.S. Application Data continuation of application No. 16/202,605, filed on Nov. 28, 2018, now Pat. No. 10,904,754.

(56) References Cited

U.S. PATENT DOCUMENTS

| | | | |
|---|---|---|---|
| 9,143,942 | B2 | 9/2015 | Agarwal et al. |
| 9,854,023 | B2 | 12/2017 | Ramakrishnan et al. |
| 10,904,754 | B2 * | 1/2021 | Linton .................. H04W 12/02 |
| 11,627,459 | B2 * | 4/2023 | Linton .................. H04L 9/3218 455/411 |
| 2002/0168977 | A1 | 11/2002 | Di Pasquale et al. |
| 2003/0071847 | A1 | 4/2003 | Vacquie |
| 2003/0219024 | A1 | 11/2003 | Purnadi et al. |
| 2005/0198351 | A1 | 9/2005 | Nog et al. |
| 2010/0014662 | A1 | 1/2010 | Jutila |
| 2010/0174911 | A1 | 7/2010 | Isshiki |
| 2011/0222527 | A1 | 9/2011 | Hole et al. |
| 2014/0089660 | A1 | 3/2014 | Sarangshar et al. |
| 2014/0173274 | A1 | 6/2014 | Chen et al. |
| 2014/0205090 | A1 | 7/2014 | Li et al. |
| 2015/0221149 | A1 | 8/2015 | Main et al. |
| 2015/0341340 | A1 | 11/2015 | Lu et al. |
| 2018/0020351 | A1 | 1/2018 | Lee et al. |
| 2018/0324585 | A1 | 11/2018 | Nair et al. |
| 2019/0303929 | A1 | 10/2019 | Brown et al. |
| 2020/0092101 | A1 | 3/2020 | Ajitomi et al. |
| 2020/0287890 | A1 | 9/2020 | Edgington |

OTHER PUBLICATIONS

Bichsel, et al., "Cryptographic Protocols of the Identity Mixer Library", IBM Research, Zurich Research Laboratory, Switzerland, Mar. 19, 2009, 34 pages.

Fenner et al., "XTreeNet: Scalable Overlay Networks for XML Content Dissemination and Querying (Synopsis)", Web Content Caching and Distribution, 10th International Workshop, IEEE, 2005, 6 pages.

Bu et al., "A survivable DOS-resistant overlay network", Computer Networks 50.9 (2006): 1281-1301, 21 pages.

Anonymous, "Identity Mixer", https://www.zurich.ibm.com/identity_mixer/, IBM, accessed Sep. 18, 2018, 6 pages.

Anonymous, "Sovrin™: A Protocol and Token for Self-Sovereign Identity and Decentralized Trust", Sovrin identity for all, A White Paper from the Sovrin Foundation Version 1.0, Jan. 2018, 42 pages.

Anonymous, "GSM procedures", https://en.wikipedia.org/wiki/GSM_procedures, accessed Sep. 20, 2018, 3 pages.

Anonymous, "GSM—Security and Encryption", htlps://www.tutorialspoint.com/gsm/gsm_security.htm, accessed Nov. 14, 2018, 2 pages.

Anonymous, "MSP Implementation with Identity Mixer", https://hyperledger-fabric.readthedocs.io/en/release-1.2/idemix_html, accessed Nov. 14, 2018, 6 pages.

List of IBM Patents or Patent Applications Treated as Related, Mar. 1, 2023, 1 page.

* cited by examiner

CELLULAR NETWORK AUTHENTICATION UTILIZING UNLINKABLE ANONYMOUS CREDENTIALS

BACKGROUND

The present invention relates generally to user authentication and, more particularly, to authenticating cellular network users through unlinkable credentials.

Global System for Mobile Communications or GSM is a set of standards for cellular networks (mobile device networks). GSM procedures are a set of steps performed by the GSM network and devices on it in order for the network to function. Typical GSM procedures include authentication methods utilizing a visitor location registers (VLR) and Home Location Register (HLR). In general, a VLR checks a database to determine whether there is an existing record of a particular network subscriber, and communicates with the HLR to obtain a copy of subscription information.

Today's cellular network carriers collect some of the most sensitive and comprehensive personal information available. The handling of such information is not extensively regulated today, but with the coming of General Data Protection Regulation (GDPR) and the general increase in privacy legislation with attendant financial liability, many companies are turning to strategies of reducing risk by reducing the amount of sensitive data that they handle. Prior schemes for cellular "anonymity" are not truly anonymous: when connecting to these systems, a Home Location Register (HLR) must validate the actual identity of a mobile device.

Various cryptographic protocols have been developed in an attempt to address privacy and authentication needs of users. One type of cryptographic protocol is an unlinkable anonymous credential, which is a cryptographic protocol for privacy-preserving authentication and transfer of certified attributes. In one example of an unlinkable anonymous credential is the Sovrin™ system of The Sovrin Foundation.

SUMMARY

In an aspect of the invention, a computer-implemented method includes: contacting, by a computing device, a mobile device network with a request to connect to the mobile device network; conducting, by the computing device, an interactive credential issuance protocol with an Issuer of the mobile device network to generate an unlinkable anonymous credential; and connecting, by the computing device, to the mobile device network based on a Verifier of the mobile device network verifying the computing device based on the unlinkable anonymous credential. Advantageously, such implementations enable anonymous but still strongly authenticated operations, thus preserving the privacy of mobile network customers.

In implementations, the method further comprises obtaining a modified temporary mobile subscriber identity filled with a null value. Advantageously, replacing identifying information with a null value preserves use privacy of network users. In yet other embodiments, the method further comprises an overlay router as the Issuer. Such embodiments enable complete anonymity of a mobile network user, with no element of the network other than an overlay router (which may be managed by legal entity separate from a network provider) ever knowing the specific identity of a mobile user.

In implementations of the invention, a computer-implemented method includes: receiving, by a computing device, a random nonce from an Issuer of a mobile device network; creating, by the computing device, a credential request; sending, by the computing device, the credential request to the Issuer; receiving, by the computing device, an unlinkable anonymous credential from the Issuer based on the credential request; connecting, by the computing device, to the mobile device network based on a Verifier of the mobile device network verifying the unlinkable anonymous credential of the computing device. Such methods enable anonymous but still strongly authenticated operations, thus preserving the privacy of mobile network customers.

In implementations, the method further comprises obtaining a modified temporary mobile subscriber identify filled with a null value. Replacing identifying information with a null value preserves use privacy of network users. In yet other embodiments, the method further comprises an overlay router as the Issuer, which is managed by a different entity than the mobile device network and insulates identifiers of the mobile device from the mobile device network. Such methods enable complete anonymity of a mobile network user, with no element of the network other than an overlay router ever knowing the specific identity of a mobile user.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
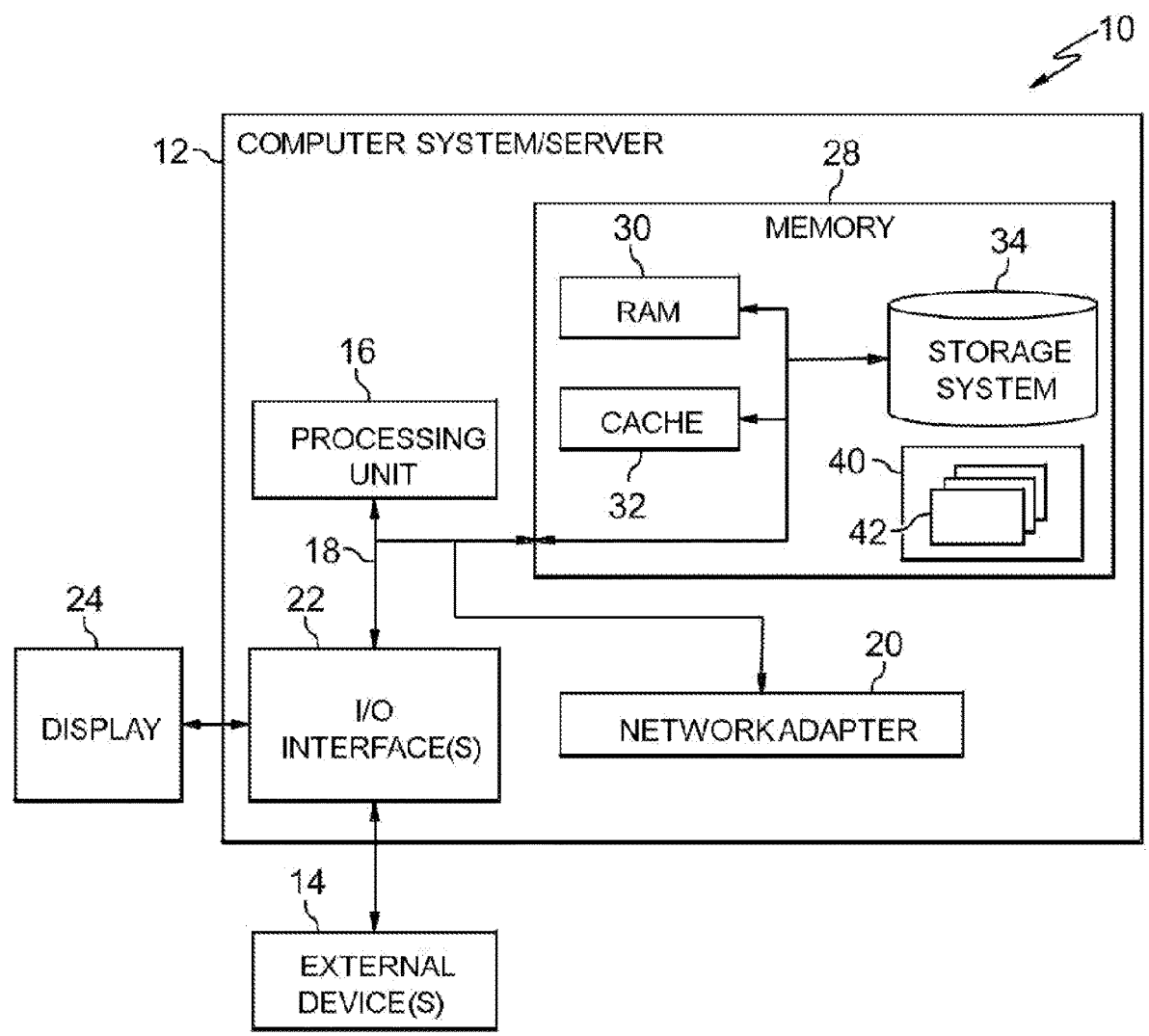
FIG. 1 depicts a computing infrastructure according to an embodiment of the present invention.

The present invention relates generally to user authentication and, more particularly, to authenticating cellular network users through unlinkable credentials. In embodiments, a method of operating a cellular network (mobile device network) is provided which utilizes unlinkable credentials to authenticate and authorize all sensitive operations, enabling anonymous (but still strongly authenticated) use of the system by mobile customers. In aspects, existing operations of 4G and 5G cellular architectures may be utilized in combination with unconventional authentications steps of the present invention in order to balance ease of implementation with robust security and privacy. In aspects, all authentication functions of a cellular network are preplaced by anonymous authentication.

As noted above, today's cellular network carriers collect some of the most sensitive and comprehensive personal information available. Typically, cellular networks cannot operate without collecting this sensitive personal information. Advantageously, embodiments of the present invention enable anonymous but still strongly authenticated operations, thus preserving the privacy of mobile customers.

In contrast to existing systems, embodiments of the present invention enable complete anonymity of a mobile user, with no element of the network other than an overlay router (which may be managed by legal entity separate from a network provider) ever knowing the specific identity of a mobile user. In aspects, a new function similar to a Virtual Private Network (VPN) overlies a carrier network, which maps the intransigent identity of a mobile device and/or user onto ephemeral temporary identity elements used by the network. This function may be used to keep all client identity data separate from network carrier operations, and in a separate security domain, to insulate the carrier from risk while maintaining the ability of the carrier to comply as necessary with information requests.

Thus, embodiments of the invention constitute improvements in the field of cellular networks by providing modified Global System for Mobile Communications (GMS)/General Packet Radio Service (GPRS) mobile wireless network architecture which operates with robust mobile station/subscriber anonymity. Advantageously, embodiments of the invention allow for software/firmware modifications to legacy 4G/5G GSM systems to enable authentication techniques of the present invention without the need for costly systemic hardware modifications.

In a typical authentication/authorization system, there are three parties: (1) the user of a credential (e.g., a mobile device that wants to prove it holds a current valid credential); (2) the Issuer of a credential (e.g., a mobile device network operator or a third party organization that managers subscriber accounts); and (3) the Verifier, which may be one or more elements of a system that need to verify that the holder actually holds a valid current credential (e.g., an authentication center (AuC)).

In a typical access control system, the credential itself is issued by an Issuer to a user of the system. When a Verifier challenges the user, the user reveals as their credential a public key complement of a private key specific to that credential. The drawback of this approach is that the same public/private key pair is always used, so that repeated showing of the same public key may reveal the identity and usage patterns of the user.

Advantageously, embodiments of the invention utilize an unlinkable credentials system. In aspects, instead of showing a credential to a Verifier, the user performs a new, unique and typical interactive Zero Knowledge Proof that the user possesses the required credential. The term Zero Knowledge Proof refers to a method in cryptography by which a first party (the prover) can prove to a second party (the Verifier) that the first party knows a value, without conveying any information apart from the fact that the first party knows the value. In embodiments of the invention, using the Zero Knowledge Proof technique, a user can prove to an arbitrary level of certainty that the user possesses the correct credential without revealing any other information. In aspects, subsequent authentication/authorizations perform new and unique proofs that cannot be linked to previous authentication/authorizations. Thus, one user cannot be distinguished from any other user by the Verifier, and neither can one instance of access be linked to any previous instances of access by the same user. Thus, embodiments of the invention provide technical solutions to the technical problem of maintaining user privacy during cellular network authentication.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
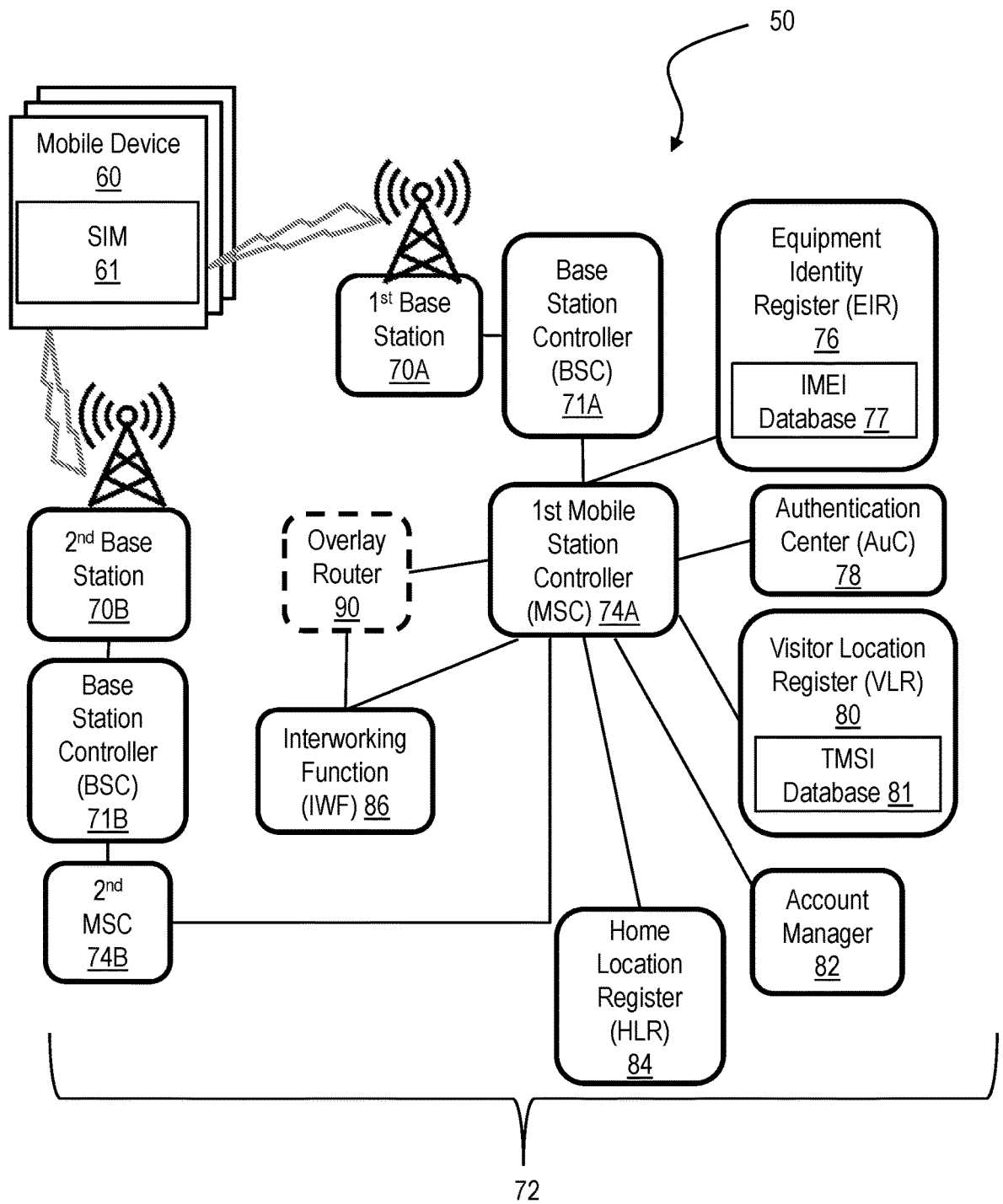
FIG. 2 shows an exemplary environment in accordance with aspects of the invention.

FIG. 2 shows an exemplary mobile network environment 50 in accordance with aspects of the invention. In embodiments, the mobile network environment 50 comprises a Global System for Mobile Communications/General Packet Radio Service (GMS/GPRS). The mobile network environment 50 includes a plurality of mobile devices 60 (e.g., mobile phones, smartphones, tablet computers, laptop computers, or other network enabled mobile computing devices). The representative mobile network environment 50 includes a Subscriber Identity Module (SIM) card 61 configured to store data of a network subscriber (user). In aspects of the invention, the SIM card 61 is configured to supply a modified international mobile subscriber identity (IMSI) in accordance with methods of the invention.

In aspects, the mobile network environment 50 further includes a plurality of base stations (base transceiver stations) represented by the first and second base stations 70A and 70B in FIG. 2. The term base station as used herein refers to equipment that facilitates wireless communication between user equipment (e.g., mobile device 60) and a network (represented generally at 72). The base stations 70A and 70B are each controlled by a respective base station controller (BSC) 71A and 71B, which each connect the respective base stations 70A and 70B to respective mobile switching centers (MSCs) 74A and 74B. The term MSC as used herein refers to a primary delivery node for a GSM, responsible for routing voice calls, short message service (SMS) and other services.

The network connections of the first MSC 74A are discussed herein; however, it should be understood that multiple MSCs with the same or similar network connections may be present in the mobile network environment 50. In embodiments, the first MSC 74A is in communication with an equipment identity register (EIR) 76, including an international mobile station equipment identity number (IMEI) database 77.

In implementations, the first MSC 74A is in communication with an authentication center (AuC) 78, whose function is to authenticate each SIM card 61 that attempts to connect to the network 72. In aspects, the MSC 74A is in communication with a visitor location register (VLR) 80, including a temporary mobile subscriber identity (TMSI) database 81, configured to contain the location of all mobile subscribers (e.g., mobile device 60) currently present within a service area of the first MSC 74A.

In embodiments, the first MSC 74A is in communication with a home location register (HLR) 84. In aspects, the HLR 84 manages group membership by verifying unlinkable credentials. This is distinguished from conventional HLRs which maintain a database of permanent network subscriber information for the mobile network 72. In the example shown, the first MSC 74A is also in communication with other MSCs, represented in FIG. 2 by the second MSC 74B. In implementations, the first MSC 74A is in communication with an interworking function (IWF) 86 configured to interface the wireless network 72 with a public switched telephone network (PSTN). In implementations, the first MSC 74A and the IWF 86 are in communication with an overlay router 90 of the present invention. In embodiments, the overlay router 90 enables a non-network provider or third party to manage mobile subscriber accounts, and to provide a layer of anonymity and privacy to mobile subscribers, as will be discussed in more detail below.

Components of the mobile network environment 50 may each comprise components of the computer system 12 of FIG. 1. For example, the mobile device 60 and the MSC 74A may each include the components of the computer system 12. Each component of the mobile network environment 50 may utilize one or more program modules (e.g., program module 42 of FIG. 1) configured to perform one or more of the functions described herein.

It should be understood that the mobile network environment 50 shown in FIG. 2 is exemplary only, and the mobile network environment 50 of the present invention may include additional or fewer components than those shown in FIG. 2. In embodiments, separate components of the mobile network environment 50 may be integrated into a single computing component or module. Additionally, or alternatively, a single component of the mobile network environment 50 may be implemented as multiple computing components or modules.

In embodiments, the mobile network environment 50 comprises the following components and their respective functions. The mobile device 60 (mobile station) is configured to register with the MSC 74A using unlinkable credentials instead of a fixed IMSI. The base station 70A (base transceiver station) enables a connection of the mobile device 60 through to the BSC 71A using unlinkable credentials instead of the fixed IMSI. The BSC 71A initiates handovers (handover events) between base stations (e.g., base station 70A and base station 70B) with variable unlinkable credentials instead of a persistent TMSI. The MSC 74A is configured to register the mobile device 60 and execute handovers to other MSCs (e.g., MSC 74B) using the unlinkable credentials instead of IMSI/TMSI lookups. In aspects, the EIR 76 includes lists of unlinkable credentials (instead of mobile device equipment IMEIs). In embodiments, the EIR 76 is a Verifier of credentials issued by the AuC 78 or the overlay router 90. Alternatively, the EIR 76 may itself be an Issuer, and works in tandem with a verify in the form of the AuC 78 or overlay router 90.

In aspects of the invention, the AuC 78 is configured to provide subscription validation on first connection of the mobile device 60 to the network 72 using anonymous authentication methods of the present invention. In aspects, the AuC 78 issues encryption keys for air link encryption (which may be performed in accordance with AuC encryption key issuing methods). In one embodiments, the AuC 78 acts as a credential Issuer. Alternatively, the AuC 78 acts as a credential Verifier in a case wherein a separate Issuer function is performed by another entity (e.g., an entity managing the overlay router 90).

In embodiments, the VLR 80 verifies the unlinkable credentials when performing a handover of the mobile device 60 from one base station 70A to another base station 70B, instead of copying down a persistent TMSI from the HLR 84. In implementations, the HLR 84 manages group membership by verifying the unlinkable credentials (instead of being a database of unique mobile device reference numbers). In embodiments, the state in the HLR 84 is refreshed regularly.

In aspects, the IWF 86 manages Internet connections of mobile devices (e.g., mobile device 60) through stateless network address translation (NAT). In embodiments, the IWF 86 relies on the overlay router 90 to manage the state of the IWF 86. In embodiments, the overlay router 90 acts as an overlay network state controller, and may be controlled by a legal entity separate from the network carrier. Optionally, the overlay router 90 operates an unlinkable credential issuer function for credentials that the AuC 78, EIR 76, VLR 80 and HLR 84 verify. The overlay router 90 may be in the form of an existing router configured to manage an overlay network. In aspects, the overlay router 90 is the only component of the mobile network environment 50 that maintains a unique and specific identifier for each mobile device (e.g., mobile device 60) in the network 72. In aspects, the overlay router 90 exists external to the mobile carrier, for example in one or more partner companies that are trusted by users to manage their personal accounts for billing and auditing purposes, so that the mobile carrier need not have any awareness of individual subscribers. In implementations, the overlay router 90 stores a mapping of phone numbers to an ephemeral identity (e.g., an unlinkable credential), which is registered to the mobile carrier when a user turns on their mobile device 60 or when the mobile device is cycled. In aspects, the overlay router 90 is functionally similar to a virtual private network (VPN) service.

In embodiments, a third party company manages mobile device user accounts (e.g., account manager 82) and the AuC authenticates mobile devices 60 attaching to the network 72, not by querying the network operator's user account database, but by verifying unlinkable credentials granted to the mobile device 60 by the third party user account management system. In such embodiments, the third party company also operates the overlay router 90, and all user traffic to and from the first base station 70A is securely tunneled across the mobile network 72 to the overlay router 90. In this way, not only does the network operator have no knowledge of users, but it also cannot associated a given user to a traffic flow, and it cannot look into any user's traffic flows.

In alternative embodiments, the AuC is connected to a user account management system (e.g., account manager 82) owned and maintained by a mobile system operator, and no overlay router 90 is utilized.

Typically, legacy GMS network authentication comprises the following steps. During a mobile device location update procedure, a Mobile Switching Center (MSC)/Visitor Location Register (VLR) forwards an International Mobile Subscriber Identity (IMSI) to a Home Location Register (HLR), and requests verification of the IMSI as well as authentication triplets. An IMSI is usually presented as a 15 digit number, wherein the first 3 digits are a mobile country code (MCC), followed by a mobile network code (MNC), and a mobile subscription identification number (MSIN). Typically, the MSIN is a 10 digit unique number that a wireless carrier uses to identify a mobile device. Authentication triplets include a 128-bit Random Number (RAND) generated by the HLR, a 32-bit Signed Response (SRES), and a 64-bit ciphering key (Kc) used as a Session Key for encryption of an over-the-air channel. The Kc is generated by a mobile device from a random challenge presented by the GMS network and from a 128-bit Individual Subscriber Authentication Key (Ki) (from the SIM card) utilizing an algorithm (e.g., A8 algorithm). Typically, each mobile device SIM card holds a unique Ki assigned to it by an operator (e.g., Issuer of a credential) during a personalization process. The Ki is also stored in a database of the AuC. Thus, in legacy GSM systems, the Ki is a unique stored shared secret between the mobile device and the AuC, which uniquely identifies the mobile device.

In such legacy systems, the HLR forwards the IMSI to the Authentication Center (AuC) and requests the authentication triplets. The AuC generates the triplets and sends them along with the IMSI back to the HLR. The AuC also sends a RAND to the mobile device (e.g., via the base station). The mobile device computes the SRES based on the encryption of the RAND with the authentication algorithm (A3) using the Ki. The mobile device forwards the SRES to the base station and the base station forwards the SRES to the MSC/VLR. The MSC/VLR compares the SRES generated by the AuC with the SRES generated by the mobile device. If they match, then authentication is completed successfully. If the values do not match, the connection of the mobile device is terminated. Once authentication is completed in legacy systems, a Temporary Mobile Subscriber Identity (TMSI) is forwarded to the mobile device.

In contrast to legacy GMS network authentication methods that utilize a stored, shared secret (Ki) between a mobile device and an AuC during authentication, embodiments of the present invention utilize a shared secret which is generated interactively between the mobile device and the Issuer (e.g., AuC) at the time of authentication (e.g., using Diffie-Hellman Secret Generation). An exemplary authentication method in accordance with embodiments of the invention will now be discussed with respect to FIG. 3.

Connection of a Mobile Device to a Network

Figure 3:
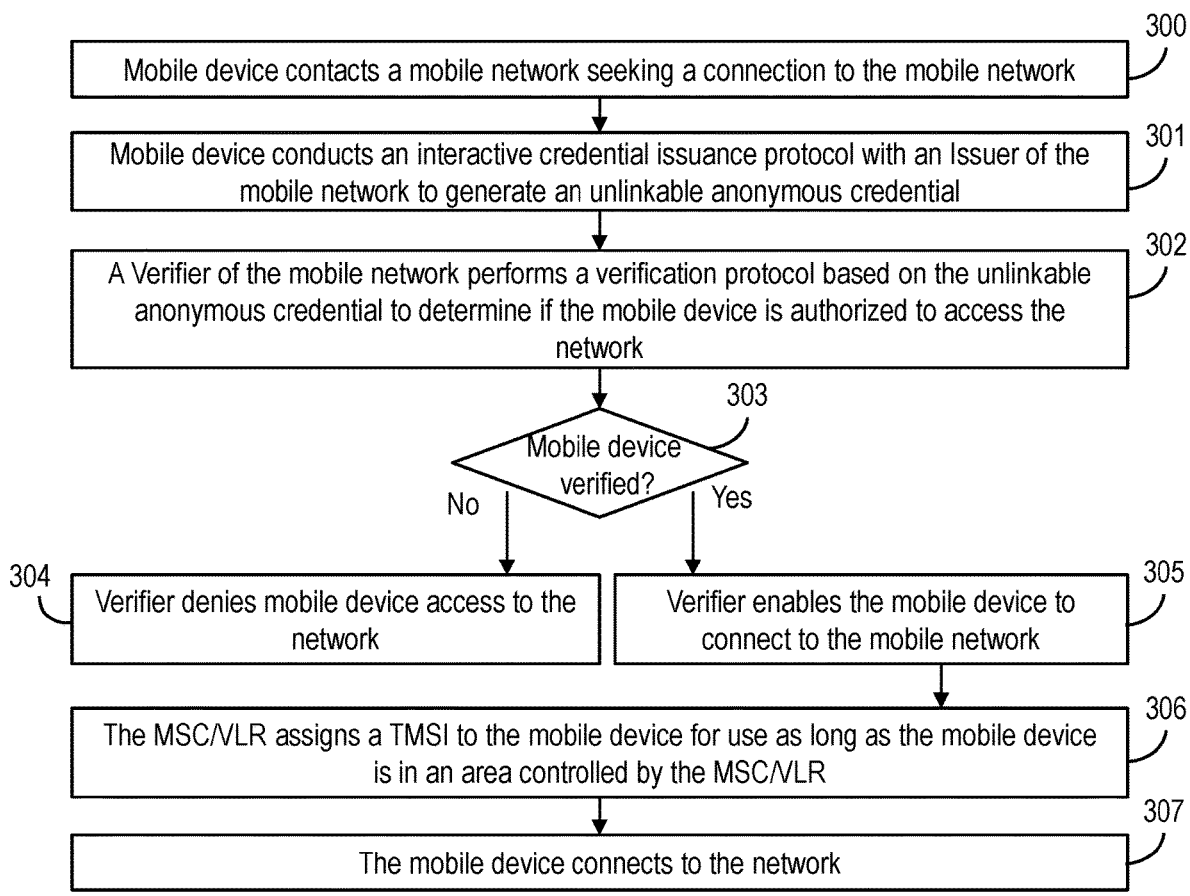
FIG. 3 shows a flowchart of mobile communications authentication steps in accordance with aspects of the invention.

FIG. 3 shows a flowchart of steps for a mobile device to connect to a network in accordance with aspects of the invention. The steps of FIG. 3 may be performed in the environment of FIG. 2 utilizing components of FIG. 2.

At step 300, the mobile device 60 contacts a mobile network (hereafter network 72) seeking a connection to the network. In aspects, the mobile device 60 sends a location update request message to the first base station 70A, including either a modified IMSI or a TMSI. As noted above, conventional IMSI numbers comprise a mobile country code (MCC), followed by a mobile network code (MNC), and a mobile subscription identification number (MSIN). Conventional IMSI numbers are unique for every Sim card (e.g., SIM 61). The modified IMSI as used herein replaces the MSIN of conventional IMSI numbers with either an ephemeral identity number generated by the Issuer (e.g., HLR or AuC) at the time the mobile device 60 is connecting to the network 72, or an anonymous subscriber value, which may be utilized by all anonymous network subscribers.

In embodiments, the modified IMSI comprises a MCC, a MNC, and zeros as place holders in the remaining numeric slots (instead of the MSIN). For example, the following represents a modified IMSI used in accordance with embodiments of the invention: MCC/MNC/00 00 00 00 00 00 00 00. In embodiments, the MCC comprises a three-digit mobile network code, and the MNC comprises a two or three-digit mobile network code. In aspects, the presence of the MCC and the MNC enable roaming between privacy-preserving carriers of the present invention and legacy wireless networks. In embodiments, the network 72 utilizes the modified IMSI in the same way it would typically utilize a conventional IMSI in a legacy system.

In implementations of the invention, the following initial connection protocol is utilized by the mobile device 60 and network 72 in accordance with step 300. Initially, the mobile device 60 sends a channel request message to the first base station 70A on a Random-Access Channel (RACH). The first base station 70A responds to the mobile device 60 on an Access Grant Channel (AGCH) with an Immediate Assignment message, and assigns a stand-alone dedicated control channel (SDCCH) to the mobile device 60. The mobile device 60 switches to the assigned SDCCH, and sends the location update request message to the first base station 70A, including a modified IMSI or a temporary mobile subscriber identity (TMSI). The first base station 70A then sends an acknowledgement to the mobile device 60 that the message has been received, and forwards the message to the first MSC 74A and VLR 80. The MSC 74A and VLR 80 forwards the modified IMSI (anonymous IMSI) of the mobile device 60 to the HLR 84 and requests verification of the IMSI. The HLR 84 forwards the modified IMSI to the AuC 78.

At step 301, the mobile device 60 conducts an interactive credential issuance protocol with an Issuer of the network 72 to generate an unlinkable anonymous credential. The term anonymous unlinkable credential as used herein refers to cryptographic protocols for privacy-preserving authentication and transfer of certified attributes. Examples of unlinkable anonymous credentials include: the Sovrin™ system of The Sovrin Foundation™; and IBM® Identity Mixer™. (IBM is a trademark of International Business Machines Corporation registered in many jurisdictions worldwide). The formation of the unlinkable anonymous credential occurs during the initial connection protocol (an example of which is described above).

In embodiments, the Issuer of the network 72 comprising a computer device, which may include aspects of the computer system 12 of FIG. 1. In embodiments, the Issuer for the network 72 is the account manager 82, and the account manager 82 interacts with the mobile device 60 to create the unlinkable anonymous credential. In alternative embodiments, the AuC 78 is the Issuer. In other embodiments, the EIR 76 is the Issuer (e.g., in tandem with the AuC 78 and/or overlay router 90 as the Verifier). In embodiments, the EIR 76 includes lists of anonymous unlinkable credentials (instead of mobile device equipment IMEIs). In yet additional embodiments, the Issuer is the overlay router 90. In aspects, the Issuer (e.g., overlay router 90) maps identifiers for each mobile device 60 to an anonymous unlinkable credential that is used by the mobile network 72, thereby insulating the identifiers from the mobile network 72.

At step 302, a Verifier of the network 72 performs a verification protocol based on the unlinkable anonymous credentials to determine if the mobile device is authorized to access the network. In embodiments, the Verifier of the network 72 comprises a computer device, which may include aspects of the computer system 12 of FIG. 1. In embodiments, the EIR 76 is the Verifier of credentials issued by the AuC 78 or the overlay router 90. In alternative embodiments, the AuC 78 of the network 72 acts as the Verifier and performs step 302. In aspects, the AuC 78 is the Verifier in cases where the Issuer function is performed by a separated entity, such as the overlay router 90.

At step 303, the Verifier of the network 72 determines whether the mobile device 60 is authorized to access the network 72 based on the verification protocol. Additional details of the verification protocol are discussed below with respect to FIG. 4.

At step 304, the Verifier denies the mobile device 60 access to the network 72 when the Verifier determines that the mobile device 60 is not authorized to access the network 72 at step 303. In this case, the connection protocol ends.

At step 305, the Verifier enables the mobile device 60 access to the network 72 when the Verifier determines that the mobile device 60 is authorized to access the network 72 at step 303. In aspects, the Verifier enables the mobile device 60 to connect to the network 72 by initiating additional connection protocol procedures utilizing elements of the network 72 (e.g., the first MSC 74A, the VLR 80, the first base station 70A and associated BSC 71A, etc.).

At step 306, the MSC 74A in conjunction with the associated VLR 80 assigns a TMSI to the mobile device 60. In aspects, the TMSI is configured for use by the mobile device 60 for as long as the mobile device 60 is in an area controlled by the MSC 74A. The MSC 74A and VLR 80 may be in the form of computer devices, and may each include components of the computer system 12 of FIG. 1. In embodiments, the mobile device 60 may utilize the TMSI as it would in a legacy GSM system. In aspects, the HLR 84 initially authenticates the mobile device 60 using the modified IMSI, then allocates the TMSI to the mobile device. Unlike in legacy GMS systems, the TMSI in this case is not saved when the mobile device leaves the network 72, but instead, a new TMSI is generated each time the mobile device leaves the network 72.

In embodiments, the TMSI is assigned for a duration that the subscriber (mobile device user) is in the service area of the associated MSC (e.g., first MSC 74A). Standard TMSIs were originally designed for use in legacy systems to ensure mobile subscriber privacy from people with scanners listening in on wireless transmissions. Accordingly, in one embodiment of the invention, a TMSI is used without modification, which allows mobile network operators the option of persisting the TMSI from one MSC to the next if they so choose. However, in alternative embodiments, the network 72 requires each VLR (e.g., VLR 80) to assign a new TMSI as the mobile device 60 moves from the first MSC 74A to the second MSC 74B, in order to maximize privacy. In aspects, this new TMSI is a modified TMSI filled with a null value (e.g., zeros) indicating an anonymous handoff.

At step 307, the mobile device 60 connects to the network 72. In aspects, mobile device 60 utilizes legacy device connection protocols to implement the connection to the network 72.

Generating Anonymous Unlinkable Credentials

Enrollment or issuance of an anonymous unlinkable credential is an interactive protocol between a user (e.g., mobile device 60) and an Issuer (e.g., the mobile network provider's user account management system). In embodiments, the Issuer takes its secret and public keys and user attribute values as input. The user takes the Issuer's public key and a user secret as input. In embodiments, the issuance protocol utilized with the network 72 comprises the following steps illustrated in FIG. 4.

Figure 4:
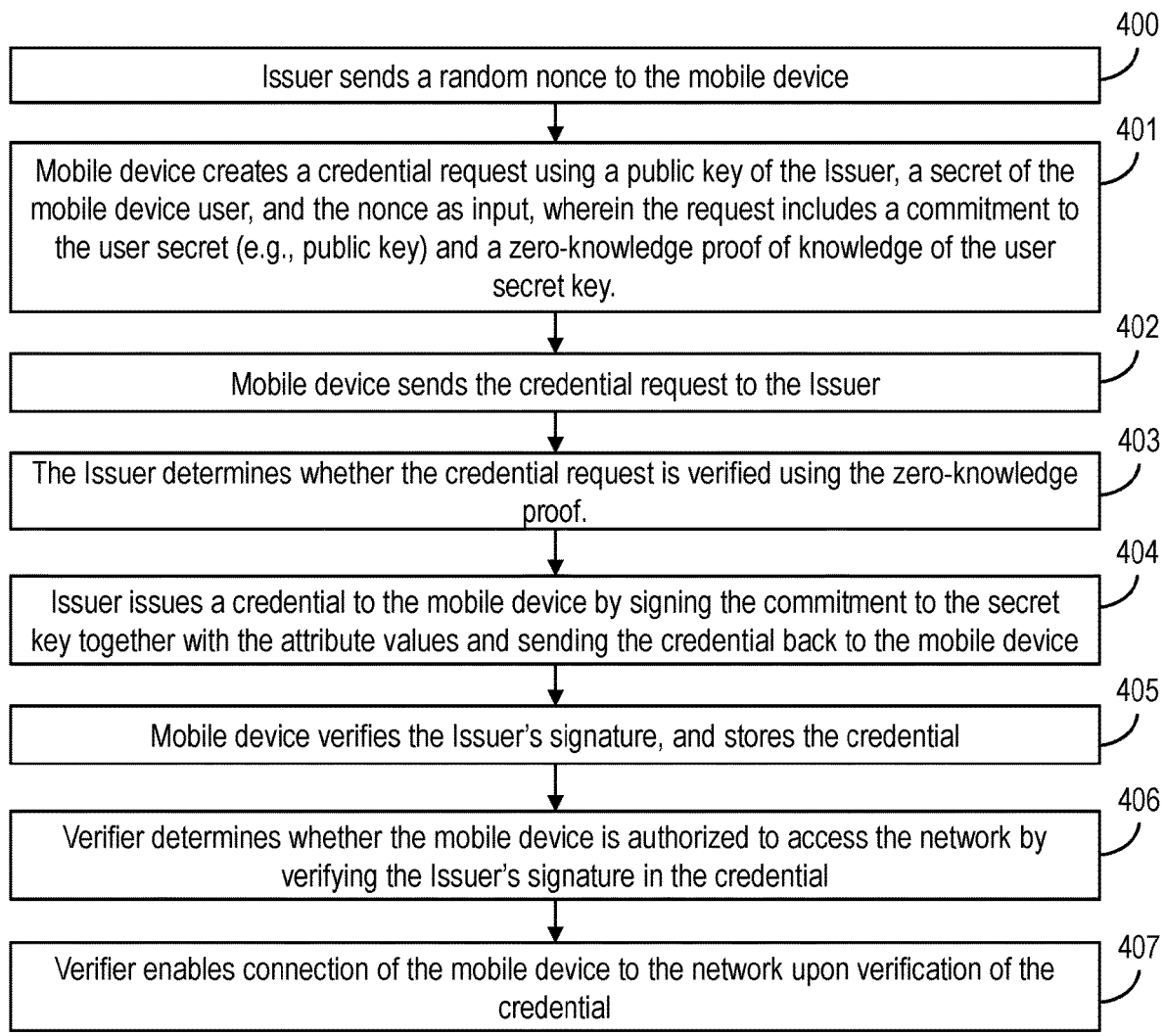
FIG. 4 shows a flowchart of an exemplary interactive credential issuance protocol in accordance with embodiments of the invention.

FIG. 4 shows a flowchart of an exemplary interactive credential issuance protocol in accordance with embodiments of the invention. The steps of FIG. 4 may be performed in the environment of FIG. 2 utilizing components of FIG. 2.

At step 400, an Issuer of the network 72 sends a random nonce to the mobile device 60. In embodiments, the Issuer of the network 72 is one of the EIR 76, AuC 78, overlay router 90, and account manager 82 of the network 72.

At step 401, the mobile device 60 creates a credential request using a public key of the Issuer, a secret of the user of the mobile device 60, and the nonce as input. In aspects, the request includes a commitment to the user secret (e.g., public key) and a zero-knowledge proof of knowledge of the secret of the user (i.e., secret key).

At step 402, the mobile device 60 sends the credential request created at step 401 to the Issuer. Mobile device protocols for sending information within a network may be utilized in the implementation of step 402.

At step 403, the Issuer determines whether the credential request received from the mobile device 60 is verified (valid) using the zero-knowledge proof. Interactive credential issuance protocols may be utilized in the implementation of step 403.

At step 404, upon determining that the credential request is valid at step 403, the Issuer issues an anonymous unlinkable credential to the mobile device 60 by signing a commitment to the secret key together with attribute values (i.e., Issuer's signature), and sending the anonymous unlinkable credential to the mobile device 60. In implementations, the anonymous unlinkable credential includes the signature value, a randomness used to create the signature, the user secret and the attribute values. In embodiments, the Issuer's signature is a signature of knowledge that signs a message and proves (in zero-knowledge) the knowledge of the user secret (and possibly attributes) signed inside the anonymous unlinkable credential. In embodiments, some of the attributes from the anonymous unlinkable credential can be selectively disclosed or different statements can be proven about anonymous unlinkable credential attributes without disclosing them in the clear.

At step 405, the mobile device 60 verifies the Issuer's signature, and stores the anonymous unlinkable credential. In aspects, the mobile device 60 stores the anonymous unlinkable credential in the SIM 61.

At step 406, the Verifier determines whether the mobile device 60 is authorized to access the network by verifying the Issuer's signature in the anonymous unlinkable credential. In aspects, the Verifier forms a secure communication channel with the mobile device 60 as part of the network connection protocol, and challenges the mobile device to perform anonymous authentication/authorization using the anonymous unlinkable credential. The Verifier may be selected from one of the AuC 78, EIR 76, VLR 80, HLR 84 and overlay router 90 of the network 72.

At step 407, the Verifier enables connection of the mobile device 60 to the network 72 upon verification of the credential at step 406. In aspects, the AuC 78 verifies at step 406 that the mobile device 60 holds a current valid anonymous unlinkable credential to operate on the network, and the AuC 78 communicates authorization to the HLR 84. In embodiments, an indication of authorization may be communicate with other elements of the network 72 (e.g., the first MSC 74A, the VLR 80, the first base station 70A and associated BSC 71A, etc.) in accordance with legacy mobile device connection methods to enable connection of the mobile device 60 to the network 72.

Handover Protocols

In embodiments, handover (handoff) of the mobile device 60 from the first MSC 74A to the second MSC 74B occurs when the mobile device 60 leaves an area controlled by the first MSC 74A and moves into an area controlled by the second MSC 74B. In implementations of the invention, handoff from the first MSC 74A to the second MSC 74B utilizes legacy handoff procedures, with the exception that the mobile device 60 undergoes a separate anonymous authentication process for each MSC/VLR area that it enters, and is assigned a new TMSI for each new area. In aspects, a new message is sent from the first MSC 74A to the second MSC 74B when actively handing off a call from the first MSC 74A to the second MSC 74B, utilizing different TMSIs for each of the first and second MSCs (74A, 74B).

In embodiments, the mobile device 60 is authenticated by the network 72 each time the mobile device 60 enters a new MSC area. In embodiments, authentication occurs utilizing anonymous unlinkable credentials in accordance with aspects of the invention in a first MSC, and utilizes legacy GSM handoff procedures when transferring from the first MSC (e.g., MSC 74A) to a second MSC (e.g., MSC 74B).

Figure 5:
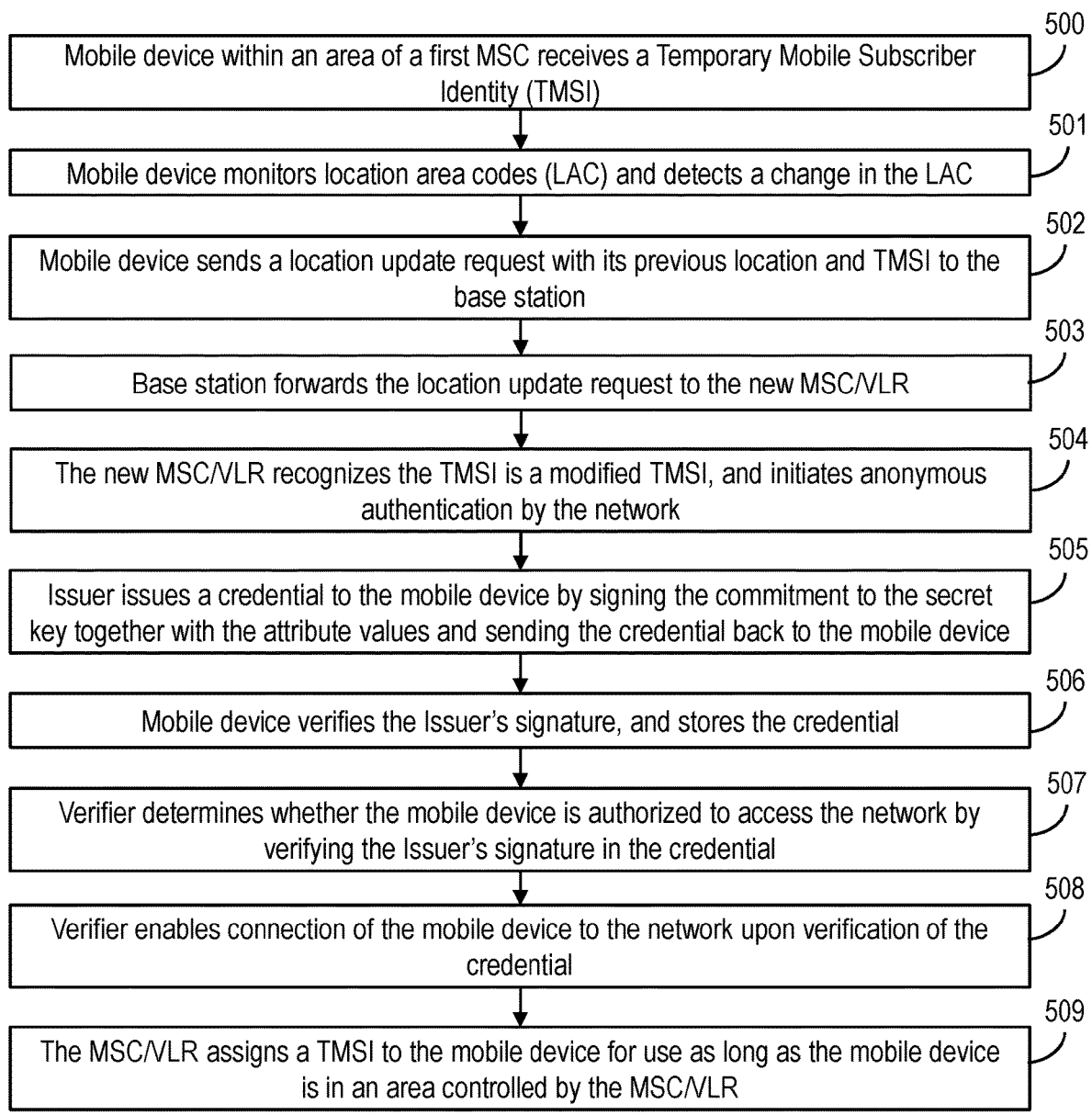
FIG. 5 shows a flowchart of an exemplary handover protocol in accordance with embodiments of the invention.

FIG. 5 shows a flowchart of an exemplary handover protocol in accordance with embodiments of the invention. The steps of FIG. 5 may be performed in the environment of FIG. 2 utilizing components of FIG. 2.

At step 500, the mobile device 60, in an area of the first MSC 74A, receives a TMSI during connection to the network 72. Step 500 may be implemented in accordance with step 306 of FIG. 3.

At step 501, the mobile device 60 monitors location area codes (LAC), and detects a change in the LAC. Legacy monitoring methods may be utilized by the mobile device 60 in the performance of step 501.

At step 502, the mobile device 60 sends a location update request with a modified TMSI (e.g., a TMSI with a null value) to the base station 70A. In the scenario of FIG. 5, the base station 70A is in communication with the first MSC 74A and the second MSC 74B.

At step 503, the base station 70A forwards the location update request with the TMSI to the second MSC 74B. It should be understood that in the example of FIG. 5, the mobile device 60 is moving from an area controlled by the first MSC 74A to an area controlled by the second MSC 74B.

At step 504, the MSC 74B recognizes the TMSI is a modified TMSI, and initiates anonymous authentication by the network 72 based thereon. In aspects, the MSC 74B initiates verification by a new AuC, EIR, VLR, or HLR (not shown) associated with the MSC 74B, or by the overlay router 90 of the network 72.

At step 505, the Issuer issues an unlinkable anonymous credential to the mobile device 60. Step 505 may be implemented in accordance with step 404 of FIG. 4, based on a credential request sent from the mobile device 60 to the Issuer, which is verified by the Issuer, in accordance with steps 402 and 403 of FIG. 4. In embodiments, the Issuer is an account manager (e.g., 82) of the network 72, an AuC (not shown) associated with the second MSC 74B, or the overlay router 90.

At step 506, the mobile device 60 verifies the Issuer's signature, and stores the unlinkable anonymous credential. In embodiments, the mobile device 60 stores the unlinkable anonymous credential in the SIM 61.

At step 507, the Verifier determines whether the mobile device 60 is authorized to access the network (e.g., the second MSC 74B) by verifying the Issuer's signature in the anonymous unlinkable credential. In aspects, the Verifier forms a secure communication channel with the mobile device 60 as part of the network connection protocol, and challenges the mobile device 60 to perform anonymous authentication/authorization using the anonymous unlinkable credential.

At step 508, the Verifier enables connection of the mobile device 60 to the network 72 (second MSC 74B) upon verification of the credential at step 507. In aspects, the AuC associate with the second MSC 74B verifies at step 507 that the mobile device 60 holds a current valid anonymous unlinkable credential to operate on the network at the second MSC 74B, and the AuC associated with the second MSC 74B communicates authorization to an HLR associated with the second MSC 74B. In embodiments, an indication of authorization may be communicate with other elements of the network 72 (e.g., the second base station 70B and associated BSC 71B, etc.) in accordance with legacy mobile device connection methods to enable connection of the mobile device 60 to the network 72 in the area of the second MSC 74B.

In embodiments, at step 509, the MSC/VLR (not shown) associated with the second MSC 74B assigns a new TMSI for use by the mobile device 60 as long as the mobile device 60 is within the area controlled by the second MSC 74B.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for cellular network authentication utilizing unlinkable anonymous credentials. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Additionally, in one exemplary embodiment, a method for anonymizing data collected from a mobile device is provided. In aspects, data collected from a mobile device is anonymized using unlinkable credentials that are validated on a mobile network using an overlay router, wherein the overlay router maps identifiers, for each mobile device in the network, to an unlinkable credential that is used by the mobile network and insulates the identifiers from the mobile network. In embodiments, the overlay router is managed by a different entity than a mobile carrier of the network.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor, a computer readable storage medium, and program instructions stored on the computer readable storage medium, the program instructions executable to cause a mobile computing device to;
contact a mobile device network with a request to connect to the mobile device network;
conduct an interactive credential issuance protocol with an Issuer of the mobile device network to generate an unlinkable anonymous credential;
connect to the mobile device network based on a Verifier of the mobile device network verifying the computing device using the unlinkable anonymous credential; and
store a temporary mobile subscriber identity (TMSI) assigned to the mobile computing device by the mobile device network, wherein the TMSI is filled with a null value, the null value indicating to the mobile device network that anonymous handover procedures are to be implemented.

2. The system of claim 1, wherein the program instructions are further executable to cause the mobile computing device to send a location update request with the temporary mobile subscriber identity (TMSI) to the mobile device network during a handover event.

3. The system of claim 1, wherein the program instructions are further executable to cause the mobile computing device to receive and save a new temporary mobile subscriber identity (TMSI) from the mobile device network upon successful completion of a handover from a first mobile switching center (MSC) of the mobile device network to a second MSC of the mobile device network.

4. The system of claim 1, wherein the program instructions are further executable to cause the mobile computing device to obtain the temporary mobile subscriber identity (TMSI) assigned to the mobile device by a visitor location register of the mobile device network.

5. The system of claim 4, wherein the temporary mobile subscriber identity (TMSI) comprises a mobile country code (MCC), a mobile network code (MNC), and the null value in place of a mobile subscription identification number (MSIN).

6. The system of claim 1, wherein the Issuer is an overlay router of the mobile device network.

7. The system of claim 6, wherein the Verifier is selected from the group consisting of: an authentication center of the mobile device network; an equipment identity register (EIR) of the mobile device network; a visitor location register of the mobile device network; and a home location register of the mobile device network.

8. The system of claim 6, wherein the overlay router is managed by a different entity than the mobile device network.

9. A computer program product comprising:
a computer readable storage medium and program instructions stored on the computer readable storage medium, the program instructions executable by a computing device of an Issuer to cause the computing device to:
conduct an interactive credential issuance protocol between the computing device of the Issuer and a mobile device seeking access to a mobile device network based on anonymous authentication protocols, wherein the interactive credential issuance protocol results in an unlinkable anonymous credential shared with the mobile device, the interactive credential issuance protocol comprising:
sending a random nonce to the mobile computing device;
receiving a credential request from the mobile computing device;
determining whether or not the credential request is valid using a zero-knowledge proof; and
in response to determining that the credential request is valid, issuing an anonymous unlinkable credential to the mobile computing device, wherein the anonymous credential includes a signature of knowledge for verification by a Verifier.

10. The computer program product of claim 9, wherein the Issuer is selected from the group consisting of: an equipment identity register (EIR) of the mobile device network, an authentication center of the mobile device network, and an account manager of the mobile device network.

11. The computer program product of claim 9, wherein the Issuer is an overlay router, and wherein the program instructions are further executable by the computing device to maintain a unique and specific identifier for each mobile device in the mobile device network.

12. The computer program product of claim 11, wherein the Issuer is the only component of the mobile device network to maintain the unique and specific identifiers for each mobile device in the mobile device network.

13. The computer program product of claim 9, wherein the Issuer is an overlay router, and wherein the program instructions are further executable to map an identifier of the mobile device to the anonymous unlinkable credential to insulate the identifier from the mobile device network.

14. The computer program product of claim 9, wherein the program instructions are further executable by the computing device to generate an ephemeral identity number to replace a conventional mobile subscription identification number (MSIN) of the mobile device to generate a temporary mobile subscriber identity (TMSI).

15. A method comprising:
conducting, by a computing device of an Issuer, an interactive credential issuance protocol between the computing device of the Issuer and a mobile device seeking access to a mobile device network based on anonymous authentication protocols, wherein the interactive credential issuance protocol results in an unlinkable anonymous credential shared with the mobile device, the interactive credential issuance protocol comprising:
sending a random nonce to the mobile computing device;
receiving a credential request from the mobile computing device;
determining whether or not the credential request is valid using a zero-knowledge proof; and
in response to determining that the credential request is valid, issuing an anonymous unlinkable credential to the mobile computing device, wherein the anonymous credential includes a signature of knowledge for verification by a Verifier.

16. The method of claim 15, wherein the Issuer is selected from the group consisting of: an equipment identity register (EIR) of the mobile device network, an authentication center of the mobile device network, and an account manager of the mobile device network.

17. The method of claim 15, wherein the Issuer is an overlay router.

18. The method of claim 17, wherein the program instructions are further executable by the computing device to maintain a unique and specific identifier for each mobile device in the mobile device network, wherein the Issuer is the only component of the mobile device network to maintain the unique and specific identifiers for each mobile device in the mobile device network.

19. The method of claim 17, wherein the program instructions are further executable to map an identifier of the mobile device to the anonymous unlinkable credential to insulate the identifier from the mobile device network.

20. The method of claim 15, wherein the program instructions are further executable by the computing device to generate an ephemeral identity number to replace a conventional mobile subscription identification number (MSIN) of the mobile device to generate a temporary mobile subscriber identity (TMSI).

* * * * *